United States Patent [19]

Schmidek et al.

[11] Patent Number: 4,591,288
[45] Date of Patent: May 27, 1986

[54] JOINT CONNECTION FOR SPACE FRAMEWORK, MADE OF RODS AND JOINT MEMBERS

[75] Inventors: Reinhard Schmidek, Wuerzburg; Manfred Stark, Rimpar, both of Fed. Rep. of Germany

[73] Assignee: MERO-Raumstruktur GmbH & Co., Wurzburg, Fed. Rep. of Germany

[21] Appl. No.: 496,547

[22] Filed: May 20, 1983

[30] Foreign Application Priority Data

May 25, 1982 [DE] Fed. Rep. of Germany ....... 3219520

[51] Int. Cl.⁴ .................. F16B 2/14; F16B 43/02; B25B 13/46
[52] U.S. Cl. ................. 403/260; 403/409.1; 403/DIG. 8; 81/57.39; 81/57.46; 411/536
[58] Field of Search .............. 403/260, 409, DIG. 8, 403/171, 172, 170, 174, 178, 176; 81/57.39, 57.16, 57.34, 57.46; 411/136, 137, 138, 139, 149, 272, 273, 274, 275, 535, 536, 544; 29/446, 452

[56] References Cited

U.S. PATENT DOCUMENTS

| 2,492,470 | 12/1949 | Farkas | 81/57.39 |
| 3,038,366 | 6/1962 | Hindman | 411/433 |
| 3,285,568 | 11/1966 | Biach | 411/535 |
| 4,010,669 | 3/1977 | Kloren | 411/536 |
| 4,371,279 | 2/1983 | Prussen et al. | 403/217 |
| 4,438,615 | 3/1984 | Wendel | 403/171 |
| 4,487,094 | 12/1984 | Wilkens et al. | 81/57.39 |

FOREIGN PATENT DOCUMENTS

| 52-40262 | 3/1977 | Japan | 411/535 |
| 514923 | 11/1939 | United Kingdom | 411/149 |

Primary Examiner—Cornelius J. Husar
Assistant Examiner—Peter M. Cuomo
Attorney, Agent, or Firm—Quaintance, Murphy & Presta

[57] ABSTRACT

A joint connection for space frameworks made of rods and joint members wherein the joint members have concentric threaded bores for receiving threaded bolts for the connection of the rods with the joint members. The required torque is applied by means of screwing tools through non-rotatable but axially slidable drive sleeves on the threaded bolts. The drive sleeves inserted between the rod ends and joint members are also used to bias the threaded bolts so strongly that the bias force is greater than the charges from the outside which have a dynamic effect, in order to avoid the danger of fatigue fractures. For this purpose, each drive sleeve may be formed of three parts which, on the basis of cooperating helical surfaces with suitable relative rotation of the middle part relative to both outside parts, are axially adjustable in opposite directions to axially bias the threaded bolt to lengthen it and therewith to axially bias it.

4 Claims, 9 Drawing Figures

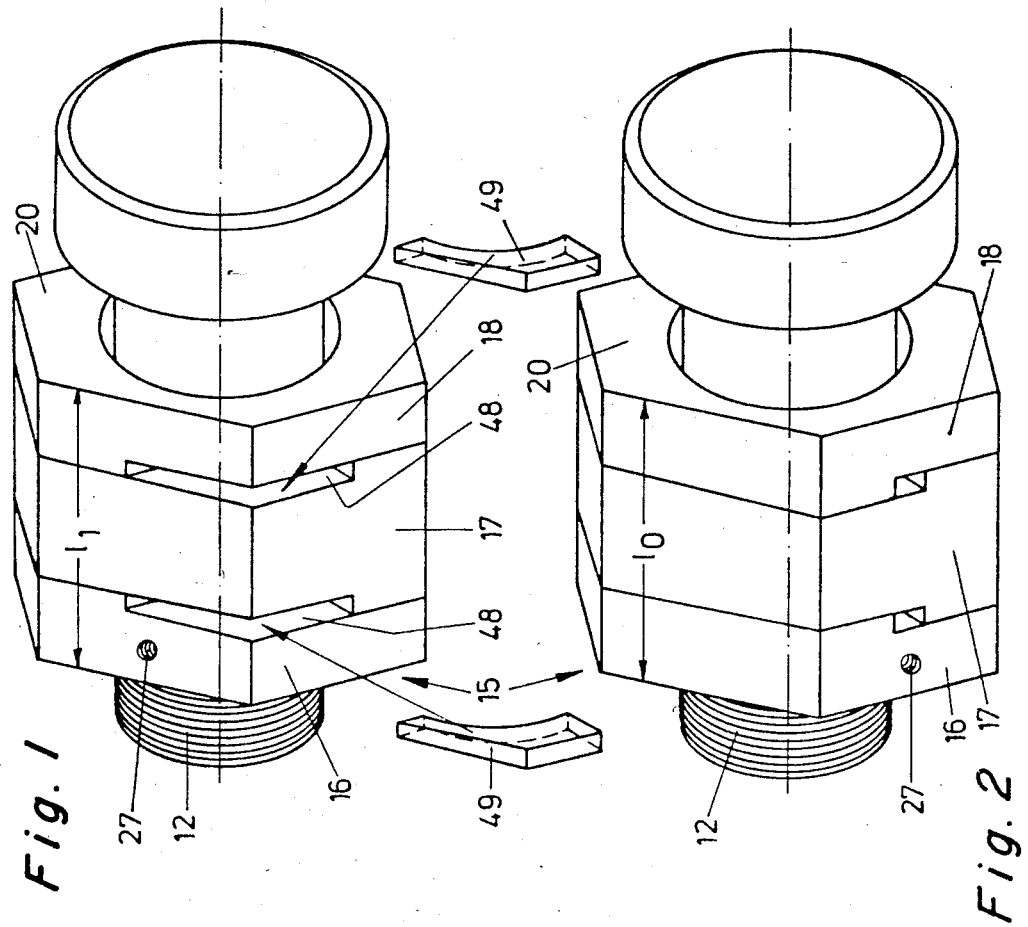
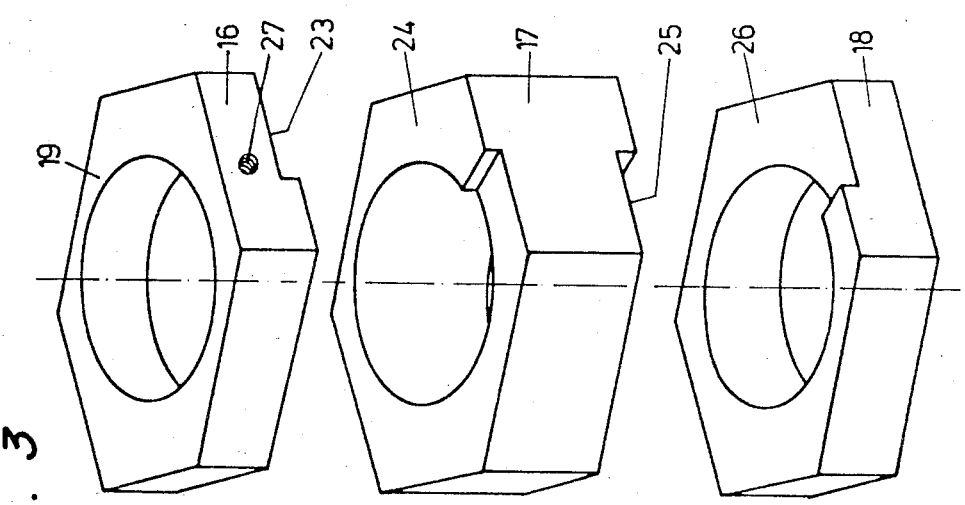

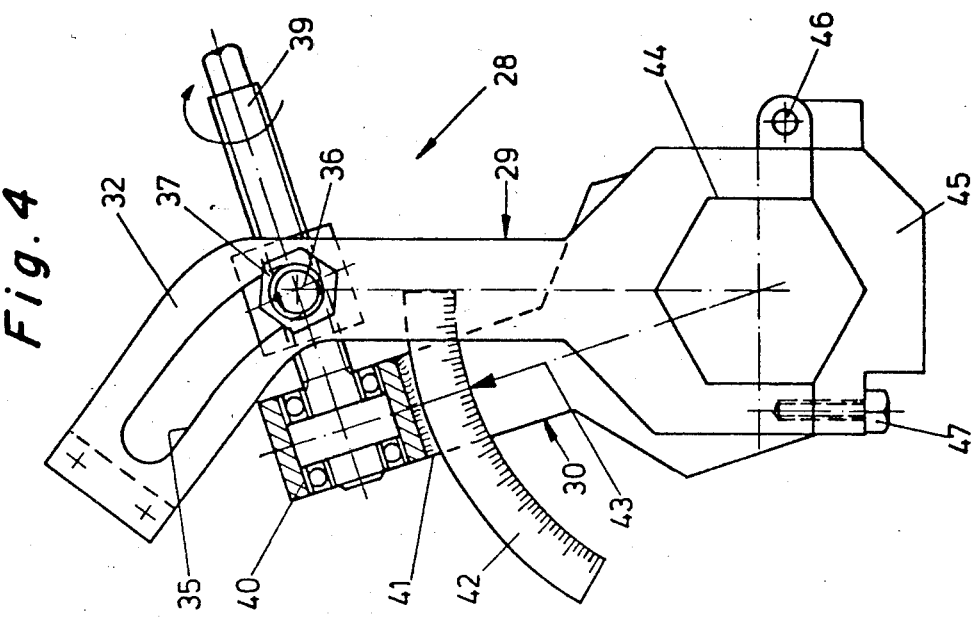
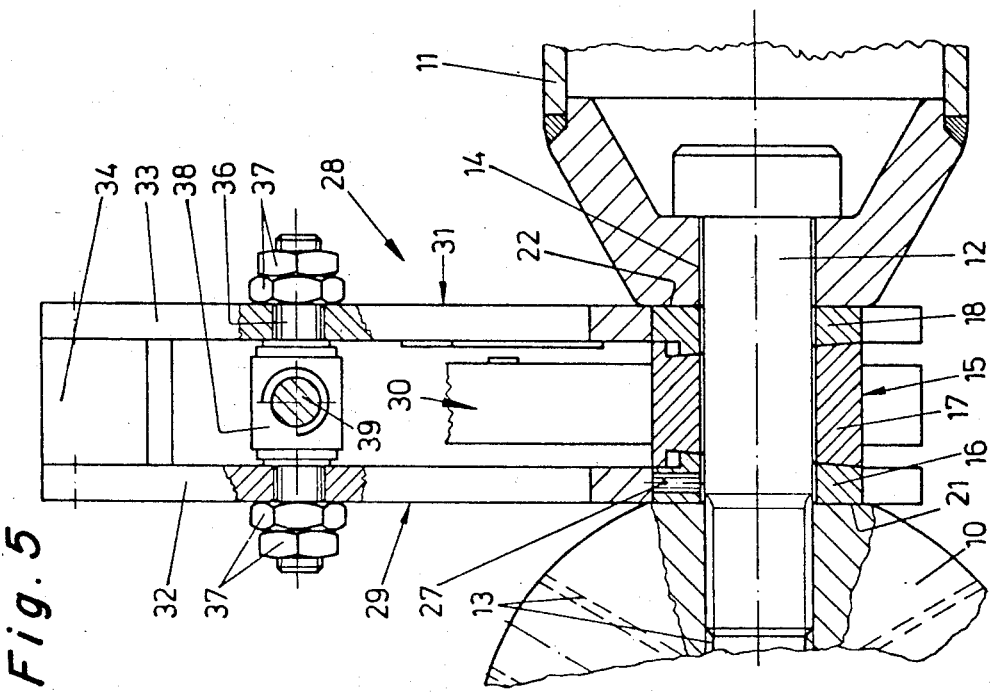

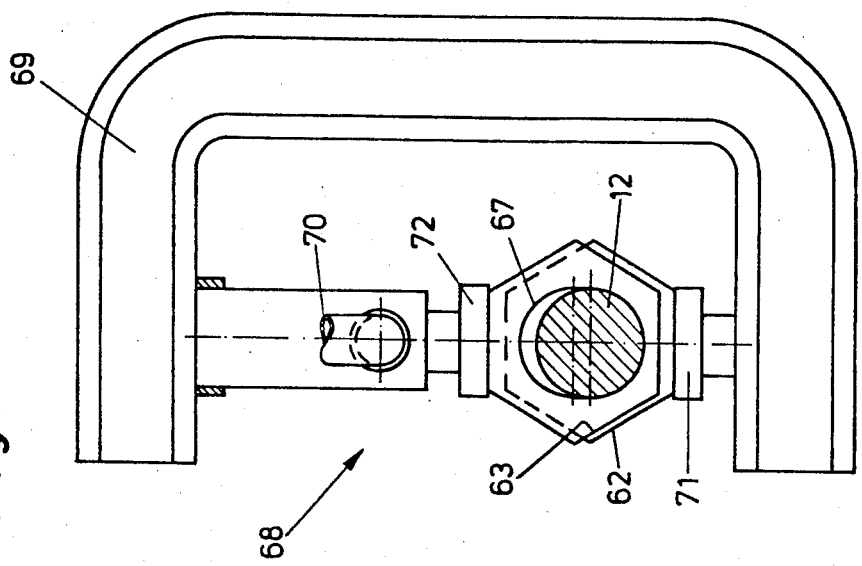
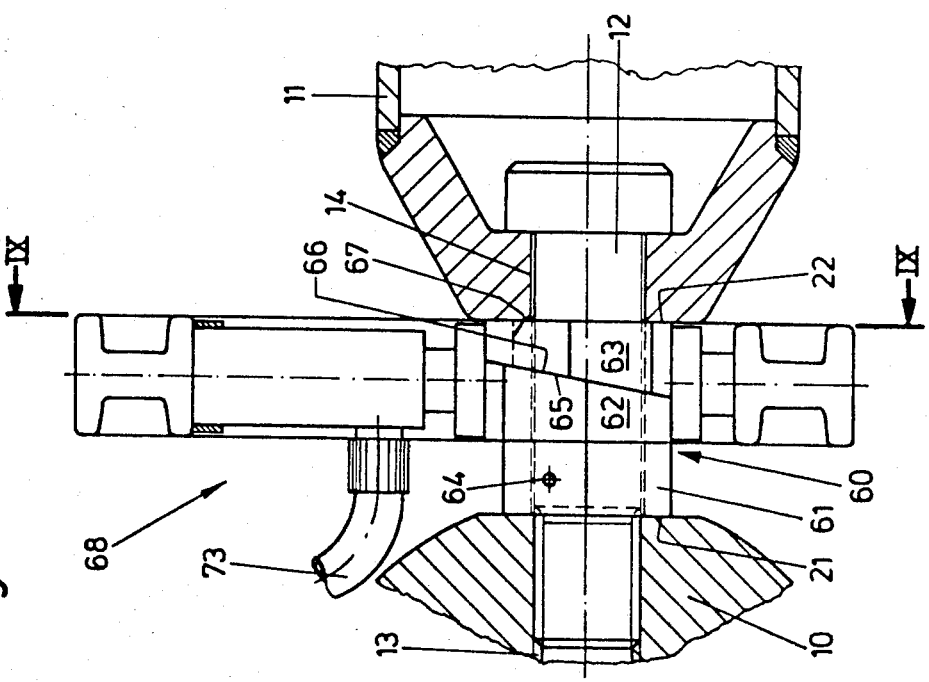

JOINT CONNECTION FOR SPACE FRAMEWORK, MADE OF RODS AND JOINT MEMBERS

BACKGROUND OF THE INVENTION

The present invention relates to a joint connection for space frameworks made of rods and joint members, with concentric threaded bores in the joint members to receive threaded bolts, which can be driven with the aid of non-rotatable but axially movable drive sleeves, and can be biased to connect the rods with the joint members, whereby the drive sleeves are inserted between the rod ends and the joint members.

The threaded bolts of these types of joint connections can be set out in axial direction by dynamic charges, which can for a long time generate the danger of breaks in them which would have serious consequences. Actually, it is known to bias (to lengthen) the threaded bolts through the drive sleeves by means of a torque wrench so strongly that the bias force is greater than the charges being effected dynamically from the outside. Starting from a certain size of joint connection and therewith threaded bolts, however, this method is no longer suitable because of the relatively high torque then being applied and the reaction torque which is occurring thereby, which causes rotation of the joint member. The so-called hydraulic wrenches known for the production of such high torque are very difficult to use because of the continually changing lever arms.

SUMMARY OF THE INVENTION

An object of the present invention is a joint connection for space frameworks, of which the threaded bolts can be very strongly biased (lengthened) with the aid of a simple and easily operable tool, in order to avoid the danger of fatigue fractures of these bolts when the dynamic charges are no longer working.

According to the invention, this is accomplished by a joint connection of the above type wherein the drive sleeves comprise at least two parts, which are adjustable on the basis of cooperating helical or wedge surfaces or threads (incl. left and right threading) with corresponding relative axial movement in opposite directions, in order to lengthen the threaded bolts.

When the drive sleeve parts are axially adjusted in opposite directions by suitable relative movement, they are pressed against the relevant joint member or rod end and, with a continuing relative movement, they cause the axial bias of the threaded bolt, which can be so extensive that it is greater than the dynamic charges acting on that threaded bolt from the outside. Even large threaded bolts can themselves be biased (lengthened) by means of the drive sleeve according to the present invention, to form more biased space frameworks in the above manner, wherein a relatively simple tool can be used to produce the required relative movement between the drive sleeve parts. In this manner, both the starting torque and the reaction torque work advantageously on the drive sleeve parts. A relatively small and manual tool can be used, which simplifies the assembly. The detachment of the joint connection according to the invention is possible by means of the same tools. The drive sleeve according to the invention is also structurally very simple. Furthermore, it is to be noted that a framework rod with connections biased according to the invention also shows a favorable resistance to transverse oscillations, which can arise as a result of wind (Karman centrifuge formation).

Other features of the invention are as follows:

(1) If only one part of the multipart drive sleeve is non-rotatable, but is arranged axially slidable on the threaded bolt, the structural cost is further reduced.

(2) If the drive sleeve consists of three parts, which are provided with opposing screw surfaces (left and right threading), on their sides turned toward each other, a relatively great axial adjustment range of the drive sleeve parts is attained in a simple manner by use of helical surfaces with a relatively low degree of incline.

(3) By the provision of check elements, the lengthening (bias) of the threaded bolts can be assured permanently.

(4) In certain advantageous embodiments of the invention, the drive sleeve parts are screwed into each other.

(5) Still another feature of the invention is characterized in that, with the drive sleeve parts having front wedge surfaces arranged adjustably, at least one opening is arranged by means of a correspondingly enlarged opening axially transverse to the threaded bolts. This variation facilitates the use of a still more simple tool to produce the required relative movement of the drive sleeve parts and further simplifies the assembly.

(6) A light, simple to operate tool is provided to produce the relative rotation of the drive sleeve parts required for an axial threaded bolt bias.

(7) If a measuring device is placed between the helical parts to be rotated relative to each other, the degree of lengthening and bias of the threaded bolts can be determined at any time during the assembly.

(8) A compact, easy to operate tool is provided for the operation of drive sleeve parts with the wedge surfaces for the purpose of biasing a threaded bolt.

BRIEF DESCRIPTION OF THE DRAWINGS

FIG. 1 is a perspective view of a threaded bolt for the present joint connection in a space framework made of rods and joint members, with a three-part drive sleeve and catch elements, wherein the drive sleeve is shown in its greatest length $1_1$;

FIG. 2 is a perspective view similar to that of FIG. 1, in which the drive sleeve is shown in its smallest extension $1_0$;

FIG. 3 is an exploded perspective view of the drive sleeve shown in FIGS. 1 and 2, wherein the individual parts are provided with fitting helical surfaces on the front;

FIG. 4 is a side elevational view of the tool for operation of the wrench sleeve shown in FIGS. 1-3;

FIG. 5 is a front elevational view of the tool shown in FIG. 4, in engagement with the drive sleeve corresponding to FIGS. 1-3, which is shown in section on a threaded bolt between the end of a rod and a joint member of a space framework;

FIG. 8 is a side elevational view of another variation of a drive sleeve of a plurality of parts, which can be lengthened by the effect of the cooperating wedge surfaces, in connection with a tool for the operation of the drive sleeve parts, and FIG. 9 is a sectional view taken substantially along line IX—IX of FIG. 8, omitting the joint member.

DESCRIPTION OF THE PREFERRED EMBODIMENTS

Figure 6:
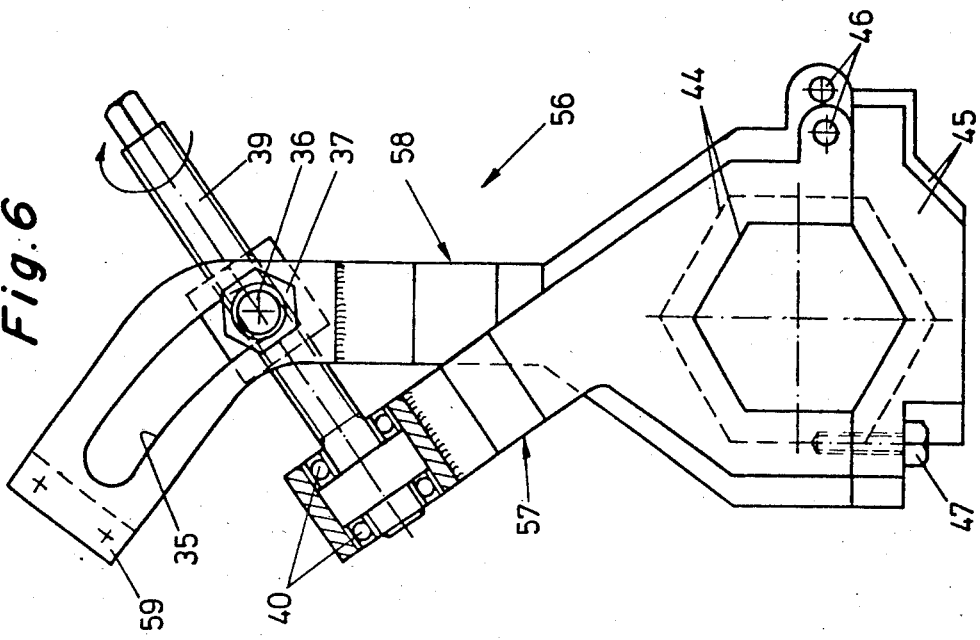
FIG. 6 is a side elevational view of another tool for the operation of a drive sleeve, which consists of two cooperating parts.

In FIG. 5, a portion of a joint connection of a space framework is shown, composed of rods and joint members. 10 is part of a joint member and 11 is the end of a rod of the space framework. A threaded bolt 12 which is screwed into one of the numerous concentric threaded bores 13 in the joint member 10 connects each rod end with a joint member 10. For this purpose, it sits rotatably and axially slidable in a bore 14 in the rod end.

A drive sleeve 15 is arranged on threaded bolt 12 between the illustrated end of rod 11 and joint member 10 which, in the embodiment shown in FIGS. 1-3 and 5, comprises three parts 16, 17 and 18. The drive sleeve parts 16 and 18 have flat surfaces 19 and 20 to the outside, which in the completed connection (FIG. 5) are pressed against a corresponding truncation 21 on joint member 10 or against a flat front surface 22 at each end of rod 11. On their sides facing each other, the drive sleeve parts 16, 17 and 18 are provided with cooperating helical surfaces 23, 24 and 25, 26. Helical surfaces 23, 24 run opposite helical surfaces 25, 26, which means that with rotation of drive sleeve part 17 relative to parts 16 and 18, the drive sleeve can be lengthened from a value $l_0$ (FIG. 2) to a value $l_1$ (FIG. 1). This is used for lengthening or biasing threaded bolt 12.

Drive sleeve part 16 serves for rotation of threaded bolt 12 in a threaded bore 13 on joint member 10 and for withdrawal of the same. Part 16 is arranged over a radial setscrew 27, which engages non-rotatably in an axial groove (not shown) on threaded bolt 12, but is arranged axially slidable relative to threaded bolt 12. The torque required for this can be applied by means of a customary monkey wrench or the like. If threaded bolt 12 is moved in this manner and drive sleeve 15 is inserted between joint member 10 and the end of rod 11, the already aforementioned bias of threaded bolt 12 can occur by means of corresponding lengthening with the aid of the three-part drive sleeve 15. For this purpose, middle drive sleeve part 17 is rotated relative to both outside drive sleeve parts 16 and 18, e.g., by tool 28.

The tool 28 has three parts 29, 30, 31, which have a monkey wrench-like effect. The outside parts 29 and 31 have end sections 32, 33 bent to the side, which are connected with each other through a part 34. Curved lengthwise holes 35 in both of the end sections 32, 33 together form a guide for a bolt 36, which is held by means of nuts 37. In its reinforced middle part 38, bolt 36 has a threaded bore to receive a threaded spindle 39. Instead of threaded spindle 39, it is also possible to use a hydraulic cylinder. The one end of this threaded spindle 39 is fastened by means of ball bearings 40 rotatably on the end 41 of middle monkey wrench-like part 30. When spindle 39 is rotated, middle part 30 is moved relative to both outside parts 29, 31. The distance of this movement can be read on a scale 42 in part 30, which cooperates with an indicator 43 on part 31. Scale 42 can advantageously be calibrated so that the axial length variation of drive sleeve 15 and thus of bolt 12 can be read on it.

The monkey wrench-like parts 29, 30 and 31 have suitable jaw-like openings 44 to hold drive sleeve parts 16, 17 and 18, which can be closed by swivelling parts 45. These parts 45 are countersunk rotatably at 46 into parts 29, 30 and 31, and can be held in closed position by screws 47. The spaces 48 (FIG. 1) arising as a result of rotation of drive sleeve part 17 relative to drive sleeve parts 16 and 18 could be closed by fitting insertable check elements 49, which hold the position of drive sleeve parts 16, 17 and 18.

Figure 7:
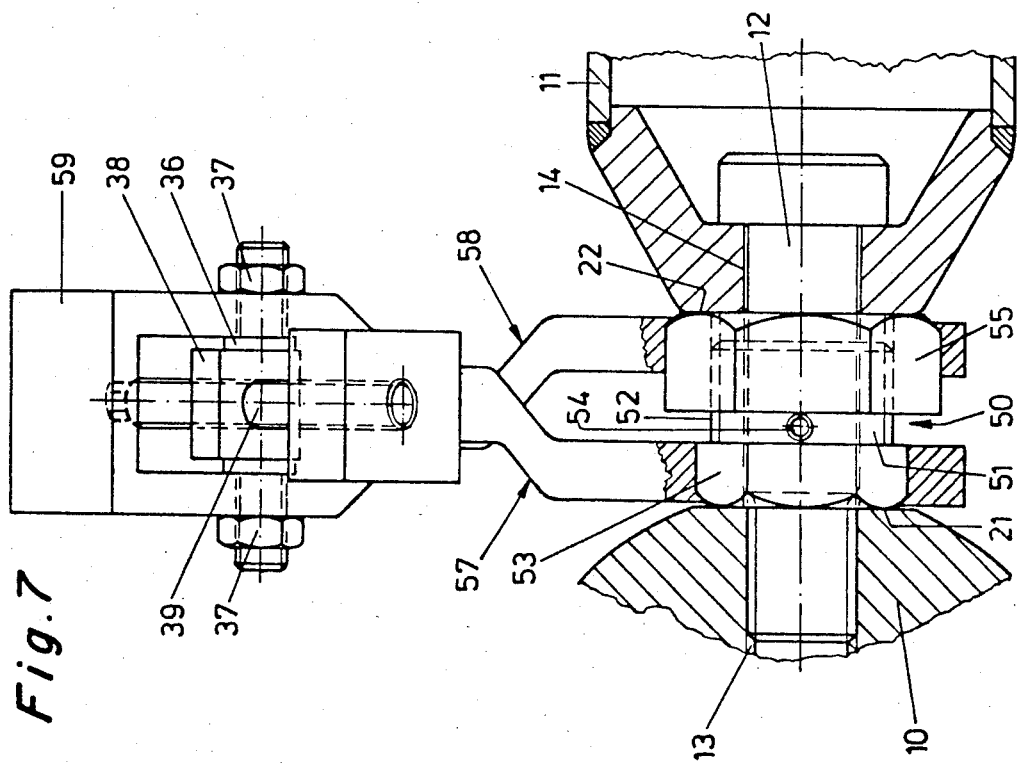
FIG. 7 front elevational view of the tool shown in FIG. 6, in engagement with both parts of a drive sleeve on a threaded bolt between the end of a rod and a joint member of a space framework.

In the exemplary embodiment shown in FIG. 7, the lengthening and therewith axial bias of threaded bolt 12 are accomplished by means of a two-part drive sleeve 50. The same parts have the same numbers as indicated in the previously described embodiment. The drive sleeve 50 has a separate sheathing 51 with outside threading 52 and an end hexagonal section 53. The sheathing 51 is arranged non-rotatably by means of a setscrew 54, which engages non-rotatably in an axial groove (not shown) on threaded bolt 12, but moves axially on threaded bolt 12. Sheathing 51 of hexagonal section 53, which can be set by a customary monkey wrench or the like, in this case serves to start to rotate threaded bolt 12 in a threaded bore 13 of joint member 10. A nut-like part 55 which projects axially over sheathing 51 is screwed onto outside threading 52 of sheathing 51. When this reaches threaded bolt 12 and thus is to be axially biased, the nut-like part 55 is turned relative to sheathing 51 or to hexagonal section 53. Tool 56 can be used for this, which corresponds in essential parts to those of the exemplary embodiment in FIGS. 4 and 5. The same parts are therefore also indicated with the same references.

In a modification of the exemplary embodiment of FIGS. 4 and 5, two monkey wrench-like parts 57 and 58 are offset to the side, and the end of part 58 is forked (FIG. 7). It includes the curved openings 35 for guide of bolt 36. The forked end of part 58 is closed at the top by a transverse part 59. When the parts 57 and 58 are set on hexagonal section 53 of sheathing 51 or nut-like part 55, with corresponding rotation of threaded spindle 39, a relative rotation between sheathing 51 and part 55 is produced, which results in lengthening of threaded bolt 12 and therewith its axial bias. Thereby the flat front surfaces of sheathing 51 are pressed against the truncations 21 on joint member 10 or against front surface 22 on the end of rod 11.

In the exemplary embodiment in FIGS. 8 and 9, drive sleeve 60 on threaded bolt 12 consists of three parts 61, 62 and 63. Drive sleeve part 16 of the embodiment of FIGS. 1-3 and 5, held by a setscrew 64, which engages non-rotatably in an axial groove (not shown) on threaded bolt 12, but is arranged axially movable on this bolt 12. This drive sleeve part 61 therefore serves as part 16 for the beginning rotation of bolt 12 for the production of a rod connection. Drive sleeve parts 62 and 63, on their sides turned toward each other, are provided with wedge surfaces 65 and 66. Also, drive sleeve part 63 has a lengthwise opening 67 for the passage of threaded bolt 12, in order to facilitate a transverse axial movement of drive sleeve part 63 on threaded bolt 12. With this axial transverse movement of drive sleeve part 63 relative to drive sleeve part 62, wedge surfaces 65 and 66 cooperate and increase the length of drive sleeve 60. Since it is inserted between the truncation 21 on joint member 10 and the flat front surface 22 on the end of rod 11, the extension of drive sleeve 60 causes a lengthening of threaded bolt 12 and thus provides the desired axial bias.

The above transverse axial setting and adjustment of drive sleeve part 63 relative to drive sleeve part 62 can be accomplished with a tool 68. The tool 68 has an essentially C-shaped rigid staple-like member 69. A hydraulic cylinder 70 and a bearing arm 71 are mounted on its arms facing each other. The piston 72 of hydraulic cylinder 70 and the bearing arm 71 are of such dimensions that they can support drive sleeve parts 62 and 63 on opposite surfaces. When hydraulic liquid is fed to hydraulic cylinder 70 through a line 73, piston 72 is moved out and moves the drive sleeve part 63 transverse-axially relative to drive sleeve part 62. It is to be noted that the friction on wedge surfaces 65 and 66 is so great that the drive sleeve parts 62 and 63 are held in their positions. Following the lengthening or biasing of bolt 12 which occurs as a result of the described lengthening of drive sleeve 60, with reversal of a control valve (not shown), piston 72 is returned into hydraulic cylinder 70, so that tool 68 can be removed.

Instead of the threaded bolt 12 with a head as shown in the present exemplary embodiments, a bolt with a differential threading can be used, screwed into a threaded bore 13 of the joint member 10 or into a threaded bore in any end of rod 11. Furthermore, in a further modification, a different non-rotatable connection can be used, which allows a limited axial relative movement between drive sleeve and threaded bolt.

We claim:

1. A joint connection for a space framework made of rods and joint members, with concentric threaded bores in the joint members to receive threaded bolts, which can be pushed in and biased with the aid of drive sleeves which are non-rotatable and axially movable, in order to connect the rods with joint members, wherein the drive sleeves are inserted between the ends of the rods and the joint members, characterized in that the drive sleeves (15) each comprise three parts, which are adjustable by the cooperation of helical surfaces (23, 24; 25, 26) running in opposite directions on the sides of the parts facing each other, with corresponding relative axial movement in opposite directions, in order to lengthen the threaded bolts (12), and a tool to carry out the joint connection formation, characterized by three parts (29, 30, 31) which have a monkey wrench effect, to hold the drive sleeve parts to rotate relative to each other, whereby the monkey wrench-like parts (29, 31) have curved guides for a bolt (36), which has a transverse threaded bore to hold a threaded spindle (39), the curved guides for the bolt (36) having two lengthwise holes (35) in the end sections (32, 33) of the monkey wrench-like parts (29, 31), the parts (29, 31) being connected, the third monkey wrench-like part (30) being disposed between monkey wrench-like parts (29, 31), and the threaded spindle (39) being rotatably fastened to the third part (30).

2. A joint connection as in claim 1, characterized in that only one part (16) of the multipart drive sleeve (15) is non-rotatable, and is axially movable on threaded bolt (12).

3. A joint connection as in claim 1, characterized in that insertable check elements (49) are provided for the fixation of the individual parts (16, 17, 18) of drive sleeve (15) in their set positions, and the check elements (49) fit between these parts.

4. A tool as in claim 1, characterized in that a measuring device (42, 43) is mounted between the parts (30, 31) which rotate relative to each other.

* * * * *